United States Patent
Kim et al.

(10) Patent No.: US 10,861,626 B2
(45) Date of Patent: Dec. 8, 2020

(54) HIGH-TEMPERATURE SUPERCONDUCTING COIL HAVING SMART INSULATION, HIGH-TEMPERATURE SUPERCONDUCTING WIRE USED THEREFOR, AND MANUFACTURING METHOD THEREFOR

(71) Applicant: Korea Electrotechnology Research Institute, Changwon-si (KR)

(72) Inventors: Seog Whan Kim, Changwon-si (KR); Young Sik Jo, Jinju-si (KR); Rock Kil Ko, Changwon-si (KR); Dong Woo Ha, Changwon-si (KR); Hyung Wook Kim, Changwon-si (KR); Chan Park, Seoul (KR)

(73) Assignee: Korea Electrotechnology Research Institute, Changwon-si (KR)

( * ) Notice: Subject to any disclaimer, the term of this patent is extended or adjusted under 35 U.S.C. 154(b) by 180 days.

(21) Appl. No.: 15/757,048

(22) PCT Filed: Aug. 31, 2016

(86) PCT No.: PCT/KR2016/009689
§ 371 (c)(1),
(2) Date: Mar. 2, 2018

(87) PCT Pub. No.: WO2017/039299
PCT Pub. Date: Mar. 9, 2017

(65) Prior Publication Data
US 2019/0074118 A1   Mar. 7, 2019

(30) Foreign Application Priority Data

Sep. 4, 2015  (KR) .................. 10-2015-0125730
Aug. 22, 2016 (KR) .................. 10-2016-0106247

(51) Int. Cl.
*H01F 6/06* (2006.01)
*H01B 12/04* (2006.01)
(Continued)

(52) U.S. Cl.
CPC .............. *H01F 6/06* (2013.01); *H01B 12/04* (2013.01); *H01B 12/14* (2013.01); *H01F 6/00* (2013.01);
(Continued)

(58) Field of Classification Search
CPC ..... H01F 6/06; H01F 6/00; H01F 6/02; H01F 41/048; H01B 12/04; H01B 12/14; Y02E 40/60
See application file for complete search history.

(56) References Cited

U.S. PATENT DOCUMENTS 4,975,314 A * 12/1990 Yano ................ C23C 26/00
428/212
6,254,940 B1 * 7/2001 Pratsinis ............ B01J 19/088
423/289
(Continued)

FOREIGN PATENT DOCUMENTS

CN 101728018 A 6/2010
CN 102105947 A 6/2011
(Continued)

OTHER PUBLICATIONS

Pergament, "Metal-Insulator Transition Temperatures and Excitonic Phases in Vanadium Oxides", International Scholarly Research Network ISRN Condensed Matter Physics, 2011, Article ID 605913, pp. 1-5.
(Continued)

*Primary Examiner* — Paul A Wartalowicz
(74) *Attorney, Agent, or Firm* — The Webb Law Firm

(57) ABSTRACT

The present invention relates to a superconducting coil having a structure in which an insulation layer electrically
(Continued)

insulates the space between adjacent wound wires. The present invention provides a superconducting coil in which superconducting wires extended at a predetermined width in a lengthwise direction are stacked and wound, the superconducting coil comprising a metal-insulator transition (MIT) material layer interposed so as to electrically insulate space between adjacent superconducting wires in the stacking direction of the superconducting wires. According to the present invention, provided is a superconducting coil having high stability, and easily controlling electromagnetic properties including response properties and having a self-protective function against a quench phenomenon and the like during the driving of a magnet.

14 Claims, 13 Drawing Sheets

(51) Int. Cl.
H01F 41/04 (2006.01)
H01F 6/00 (2006.01)
H01F 6/02 (2006.01)
H01B 12/14 (2006.01)

(52) U.S. Cl.
CPC ............ *H01F 6/02* (2013.01); *H01F 41/048* (2013.01); *Y02E 40/60* (2013.01)

(56) References Cited

U.S. PATENT DOCUMENTS

| | | | |
|---|---|---|---|
| 7,816,303 | B2 | 10/2010 | Thieme et al. |
| 8,195,260 | B2 | 6/2012 | Otto et al. |
| 8,569,212 | B2 | 10/2013 | Ha et al. |
| 8,655,423 | B2 | 2/2014 | Miyazaki et al. |
| 2003/0032560 | A1* | 2/2003 | Otto ...................... H01L 39/143 505/100 |
| 2006/0073979 | A1 | 4/2006 | Thieme et al. |
| 2007/0080464 | A1* | 4/2007 | Goebel .................. H01L 24/05 257/774 |
| 2010/0022396 | A1 | 1/2010 | Otto et al. |
| 2010/0113280 | A1* | 5/2010 | Wu ..................... H01L 39/2448 505/150 |
| 2014/0357495 | A1* | 12/2014 | Daibo ...................... H01F 6/06 505/211 |
| 2015/0024942 | A1 | 1/2015 | Hayase et al. |
| 2015/0065350 | A1 | 3/2015 | Hobl |

FOREIGN PATENT DOCUMENTS

| | | |
|---|---|---|
| JP | 9145481 A | 6/1997 |
| JP | 1017395 A | 1/1998 |
| JP | 2006313924 A | 11/2006 |
| JP | 2010180104 A | 8/2010 |
| JP | 2011529255 A | 12/2011 |
| JP | 2012109309 A | 6/2012 |
| JP | 201327131 A | 10/2013 |
| JP | 2014192114 A | 10/2014 |
| KR | 101062808 B1 | 9/2011 |
| KR | 1020110099460 A | 9/2011 |
| KR | 1020140082634 A | 7/2014 |

OTHER PUBLICATIONS

Lee et al., "The effects of co-wound Kapton, stainless steel and copper, in comparison with no insulation, on the time constant and stability of GdBCO pancake coils", Supercond. Sci. Technol., 2014, pp. 1-16, vol. 27, IOP Publishing Ltd., UK.

Tsuda, "Electrically Conductive Oxides," pp. 260-262, Tokyo Shokabo Co., Ltd., Japan, ISBN 4-7853-2604-2 (English-language translation included).

\* cited by examiner

| Oxide | $T_t$, K |
|---|---|
| $V_2O_3$ | 150 |
| $V_3O_5$ | 450 |
| $V_4O_7$ | 240 |
| $V_5O_9$ | 130 |
| $V_6O_{11}$ | 170 |
| $V_8O_{15}$ | 70 |
| $V_6O_{13}$ | 150 |

HIGH-TEMPERATURE SUPERCONDUCTING COIL HAVING SMART INSULATION, HIGH-TEMPERATURE SUPERCONDUCTING WIRE USED THEREFOR, AND MANUFACTURING METHOD THEREFOR

CROSS-REFERENCE TO RELATED APPLICATIONS

This application is the United States national phase of International Application No. PCT/KR2016/009689 filed Aug. 31, 2016, and claims priority to Korean Patent Application Nos. 10-2015-0125730 and 10-2016-0106247, filed Sep. 4, 2015 and Aug. 22, 2016, respectively, the disclosures of which are hereby incorporated in their entirety by reference.

BACKGROUND OF THE INVENTION

Field of the Invention

The present invention relates to a superconducting coil formed by winding of a superconducting wire, and more particularly, to a high-temperature superconducting coil having a structure in which an insulating layer electrically insulates a space between adjacent wound wires.

Description of Related Art

A high-temperature superconducting wire operating at a liquefied nitrogen temperature exhibits a high threshold current density characteristic at a high magnetic field and attracts attention as application of a high magnetic field of a superconducting magnet and the like.

The high-temperature superconducting wire may have a structure in which a filament or a thin-film type superconducting part is extended within external skin of a conductive metal, and may be divided into a first-generation superconducting wire and a second-generation superconducting wire according to a structure thereof. For example, the second-generation superconducting wire has a structure in which a metal substrate, a buffer layer, a superconducting layer, and a stabilizing layer are stacked, and an external portion of the wire has a structure covered by a conductive metal, such as Cu and Ag, or an alloy thereof. Accordingly, the wires of the adjacent turns are in electrically contact with each other when the coil is wound.

In order to prevent the electrical contact, the superconducting wire may be wound in a state of being enclosed by an insulating material, such as Teflon or Kapton.

However, whether the superconducting wire configuring a superconducting magnet is insulated influences an electromagnetic characteristic, such as excitation of the superconducting magnet.

Further, whether the superconducting wire is insulated significantly influences a protection characteristic for quench. Particularly, it is known that the high-temperature superconducting wire has high thermal capacity and a high critical temperature, so that there is a low possibility that quench is generated, compared to a low-temperature superconducting wire, but actually, the high-temperature superconducting wire has a low quench propagation speed, so that there is a problem in that it is difficult to detect a quench phenomenon in the outside, and the high-temperature superconducting wire has a fatal defect in that the wire is burned out by a local quench phenomenon. In order to solve the problem, various technologies for detecting a quench phenomenon generated in the superconducting magnet and protecting the wire from the quench phenomenon have been developed, but there is no fundamental solution up to now.

SUMMARY OF THE INVENTION

In order to solve the problems in the related art, an object of the present invention is to provide a superconducting coil formed of a high-temperature superconducting wire suitable for application of a high magnetic field.

Another object of the present invention is to provide a high-temperature superconducting coil of which an electromagnetic characteristic including a response characteristic is easily controlled when being used as a magnet.

Another object of the present invention is to provide a high-temperature superconducting coil which has a function of self-protection against a quench phenomenon generated when a superconducting magnet operates.

Another object of the present invention is to provide a superconducting wire structure which is suitable to be used in the foregoing high-temperature superconducting coil.

Another object of the present invention is to provide a method of manufacturing the foregoing high-temperature superconducting wire.

Technical Solution

In an aspect of the present invention, there is provided a high-temperature superconducting coil, in which a high-temperature superconducting wire extended in a longitudinal direction with a predetermined width is wound, the high-temperature superconducting coil including: a metal-insulator transition (MIT) material layer interposed so as to electrically insulate the space between superconducting portions of the adjacent superconducting wires.

In an exemplary embodiment of the present invention, the MIT material layer may have a transition temperature equal to or higher than a critical temperature of the superconducting wire. Further, a transition temperature of the MIT material layer may be lower than a critical temperature+100 K.

Further, according to the exemplary embodiment of the present invention, electrical conductivity of the MIT material layer may increase $10^3$ times or more, more preferably, $10^5$ times or more, at a temperature around the transition temperature.

Further, the MIT material layer may have the transition temperature equal to or lower than a room temperature.

In the exemplary embodiment of the present invention, the MIT material layer may include a vanadium oxide, such as VO or $V_nO_{2n-1}$ (herein, n=2 to 9).

Further, in the exemplary embodiment of the present invention, the MIT material layer may include at least one kind of material selected from the group consisting of $Fe_3O_4$, $RNiO_3$ (R=La, Sm, Nd, or Pr), $La_{1-x}Sr_xNiO_4$ (herein, x<1), $NiS_{1-x}Se_x$ (herein, x<1), and $BaVS_3$.

According to the exemplary embodiment of the present invention, the superconducting wire may include a superconducting material and conductive external metal skin surrounding the superconducting material, and the MIT material layer may be interposed between the external metal skin of the adjacently stacked superconducting wires.

Further, the MIT material layer may be consecutively interposed or intermittently interposed in a longitudinal direction of the wound wire.

In another aspect of the present invention, there is provided a high-temperature superconducting wire, including: a superconducting portion extended in a longitudinal direction and conductive external metal skin surrounding the superconducting portion; and a metal-insulator transition (MIT) material layer, with which at least a part of an upper surface or a lower surface of the conductive external metal skin is coated and which is extended in an extension direction of the superconducting portion.

In this case, the conductive external metal skin may include a metal substrate formed with the superconducting portion and a metal layer protecting the superconducting portion. Further, the conductive external metal skin may include a metal layer surrounding the superconducting portion. Further, the MIT material layer may be intermittently extended.

In the exemplary embodiment of the present invention, the MIT material layer may include a supporter, and a metal-insulator transition material supported on the supporter. In this case, the supporter may have a mesh structure.

Further, the MIT material layer may include: MIT material powder; and a binder binding the MIT material powder.

In still another aspect of the present invention, there is provided a high-temperature superconducting wire, including: a superconducting portion extended in a longitudinal direction, and conductive external metal skin surrounding the superconducting portion; a metal-insulator transition (MIT) material layer with which at least a part of an upper surface or a lower surface of the conductive external metal skin is coated and which is extended in an extension direction of the superconducting portion; and a conductive protecting layer on the MIT material layer.

In this case, the conductive protecting layer may be electrically insulated from the conductive external metal skin. Further, the conductive protecting layer may be a metal material.

Further, the MIT material layer may be formed so as to surround at least a part of the conductive external metal skin.

In yet another aspect of the present invention, there is provided a method of manufacturing a superconducting wire, the method including: providing a high-temperature superconducting wire including a superconducting portion that has a predetermined width and is extended in a longitudinal direction, and conductive external metal skin surrounding the superconducting portion; and providing a metal-insulator transition (MIT) material layer to at least a part of an upper surface or a lower surface of the external metal skin of the superconducting wire.

In the present invention, the providing of the MIT material layer may include: providing a solution in which an MIT material is dispersed; and applying the solution onto at least the part of the upper surface or the lower surface of the external metal skin.

According to the present invention, it is possible to provide the high-temperature superconducting coil suitable for application of a high magnetic field. Further, according to the present invention, it is possible to provide the superconducting coil, of which an electromagnetic characteristic including a response characteristic is easily controlled, when is being used as a magnet, and which has a function of self-protection against a quench phenomenon and the like when the magnet operates to be highly stable.

DESCRIPTION OF THE INVENTION

Hereinafter, the present invention will be described in detail by describing exemplary embodiments of the present invention with reference to the accompanying drawings.

In a specification of the present invention, a high-temperature superconducting coil refers to a coil formed by winding a high-temperature superconducting wire.

Exemplary embodiments of the present invention described below are mainly described and illustrated based on a second-generation high-temperature superconducting wire, but the present invention is not limited thereto and is also applied a first-generation high-temperature superconducting wire. Further, the high-temperature superconducting coil of the present invention is applicable to a magnet, such as a field coil of a superconducting generator and a superconducting magnet of magnetic resonance imaging (MRI), operating in a predetermined operation mode, such as a current application mode or a permanent current mode.

Figure 1:
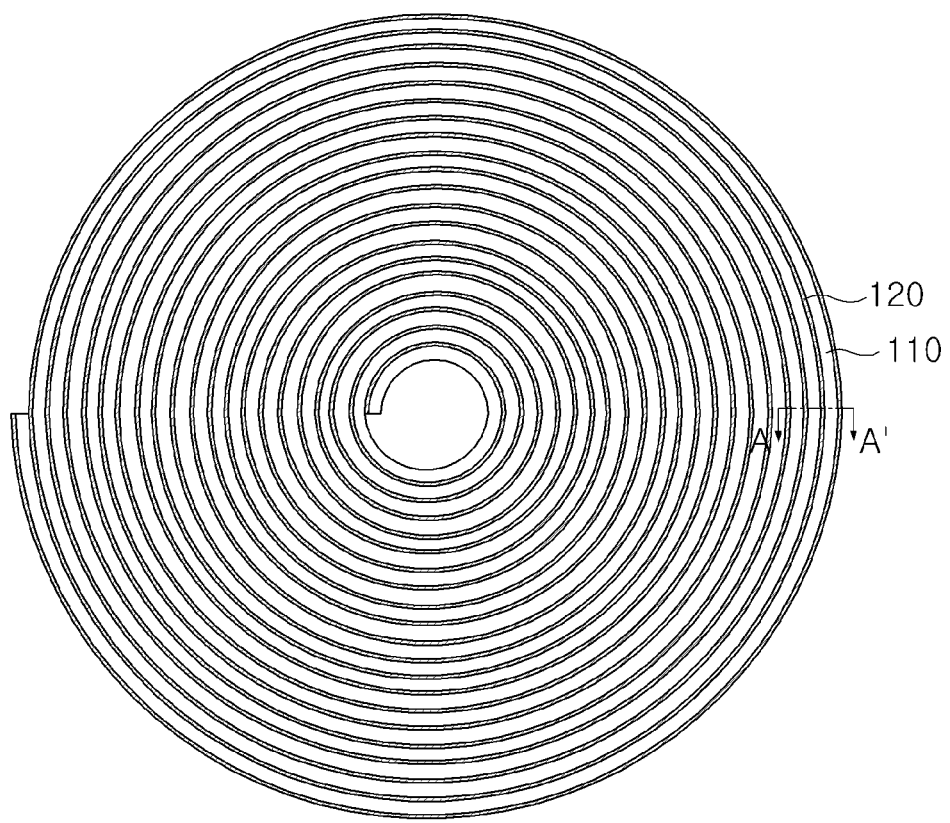
FIG. 1 is a diagram schematically illustrating a superconducting coil 100 according to an exemplary embodiment of the present invention.

FIG. 1 is a diagram schematically illustrating a superconducting coil 100 according to an exemplary embodiment of the present invention.

As illustrated in FIG. 1, a superconducting wire 110 in a tape form extended in a longitudinal direction is wound in a clockwise direction to form a stacking structure. A turn number of the wound wire forming the superconducting coil 100 may be appropriately designed according to a required characteristic of a coil. FIG. 1 illustrates the basic coil wound wire in which a cross-section of a separate wound wire forms a concentric circle, but the superconducting coil of the present invention is not limited to the illustrated structure. For example, the present invention may be applied to the whole wound wires in which the superconducting wire is stacked and/or wound, regardless of a form, such as a pan-cake shape, a double pan cake shape, and a toroidal shape.

In the present exemplary embodiment, a metal-insulator transition (MIT) material layer 120 is interposed between the wound wires of the turns adjacent in the stack direction of the superconducting wire 110.

As illustrated in FIG. 1, the MIT material layer 120 may be consecutively extended along the wound wire. FIG. 1 illustrates the case where one MIT material layer 120 is interposed between the adjacent turns, but the present invention is not limited thereto. For example, two MIT material layers may be interposed between the adjacent turns of the superconducting coil. In this case, the interposed two MIT material layers may also be connected, but the superconducting coil 100 may also have a structure in which a third conductive layer is interposed between the two MIT material layers. In the present invention, the MIT material layer 120 insulates a space between the turns of the wound wire in a superconducting state of the superconducting wire, and may have a predetermined structure that is capable of achieving the insulation between the turns of the wound wire.

An insulated coil in the related art in which a space between turns of a wound wire of a coil is insulated by using an insulating material, such as polyimide, Teflon, and Kapton, reduces a time constant of the coil and secures a rapid response characteristic of a magnet. However, the insulated coil in the related art has a disadvantage in that electrical stability is low. For example, when quench is generated during an operation of the superconducting magnet, the insulating layer present between the turns of the insulated coil cannot transport a bypass current between the turns when the quench is generated in a superconducting portion.

Due to the problems, a non-insulated coil is used. The non-insulated coil provides a bypass path of the current between the turns to improve electrical stability, but deteriorates a response characteristic according to an increase/decrease in a current. For example, when the non-insulated coil is used as a superconducting field coil of a generator, the coil cannot exhibit a rapid response characteristic for an applied current due to a high time constant.

In the present invention, the MIT material layer exhibits advantages of the non-insulated coil and the insulated coil according to an operation state of the coil. That is, the MIT in a superconducting state at a critical temperature or lower of the superconducting wire insulates a space between the coils and enables the coil to exhibit a rapid response characteristic (charging/discharging characteristic). Then, when the superconducting coil is transited to a normal conduction state due to the quench or other abnormal heating, the MIT material layer exhibits high electrical conductivity and provides a bypass path of a current.

Figure 2:
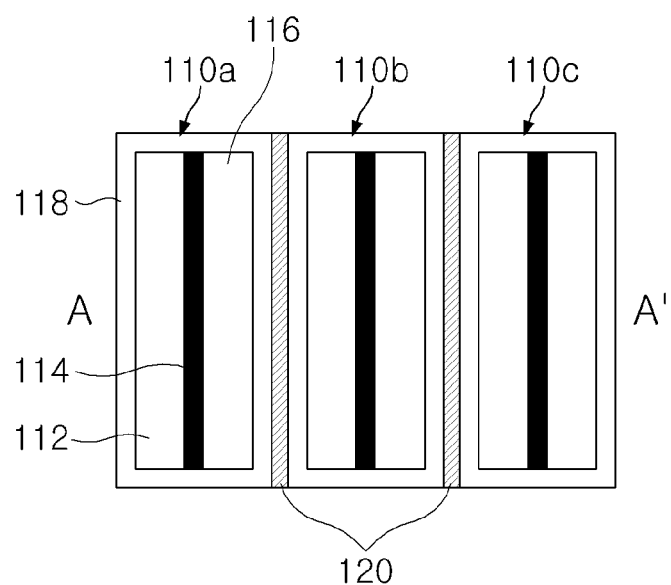
FIG. 2 is a diagram illustrating a cross-section of the coil of FIG. 1 taken along in a direction of A-A'.

FIG. 2 is a diagram illustrating an example of a cross-section of the coil of FIG. 1 taken along in a direction of A-A'.

As illustrated in FIG. 2, the superconducting wires 110a, 110b, and 110c are stacked and wound to form the coil. The superconducting wires 110a, 110b, and 110c are wound with the MIT material layer 120 interposed therebetween. The superconducting wires 110a, 110b, and 110c are the second-generation superconducting wires in which superconducting portions of the wires are formed by superconducting layers 114.

As will be described below, in order to secure a good electrical and mechanical adhesive property with the superconducting wire, the MIT material layer 120 may be provided in a form in which a surface of the superconducting wire is coated with the MIT material layer 120.

As illustrated in FIG. 2, each of the superconducting wires 110a, 110b, and 110c may include a metal substrate 112, the superconducting layer 114, a capping layer 116, and a stabilizing layer 118. A buffer layer may be formed on the metal substrate 112 in order to grow the superconducting layer 114, but is not separately illustrated herein for convenience. It is illustrated that the capping layer 116 for protecting the superconducting layer 112 is formed on the superconducting layer 114, but the capping layer 116 may be extended so as to surround a lateral portion of the superconducting layer and the substrate 112. Further, the stabilizing layer 118 is extended so as to surround the substrate 112 on the superconducting layer 114, but the form thereof may be appropriately designed by those skilled in the art. Further, thicknesses of the remaining layers, except for the metal substrate, in the drawing are very small, compared to the illustrated thicknesses, but are exaggerated and illustrated for convenience of the illustration.

Typically, the foregoing metal substrate 112 of the superconducting wire 110 may be a biaxially oriented metal substrate, such as a rolling assisted biaxially substrate (RABiTS) or a polycrystalline metal substrate, such as an ion beam assisted deposition (IBAD) substrate. The substrate may be formed of a material, such as a nickel alloy or stainless steel. The buffer layer may be formed of a biaxially oriented metal oxide layer. As the buffer layer, a material, such as $Y_2O_3$, YSZ, $CeO_2$, or MgO, may be used. Further, the buffer layer may also have a stacking structure including two or more material layers. The superconducting layer 130 may use a high-temperature superconducting material based on ReBCO ($ReBa_2Cu_3O_7$, herein, Re is at least one of metal elements consisting of Nd, Sm, Eu, Gd, Dy, Ho, and Y).

The stabilizing layer 118 may be formed of a conductive metal formed of silver, copper, or an alloy thereof. Accordingly, the MIT material layer 120 electrically insulates a space between the conductive metals of the adjacent superconducting wires 110, and a current flows through the superconducting layer 112 in a normal operation state of the superconducting wire.

In the meantime, when a specific point of the superconducting layer 112 is transited to a normal conduction state due to the quench and the like, the stabilizing layer 118 operates as the bypass path of the current. Further, a state of the MIT material layer 120 is transited to the metal state due to heat generated due to the quench phenomenon, and the current may pass through the MIT material layer 120 from one superconducting wire 110a and be transferred to the adjacent superconducting wire 110b.

MODE FOR CARRYING OUT THE INVENTION

Figure 3:
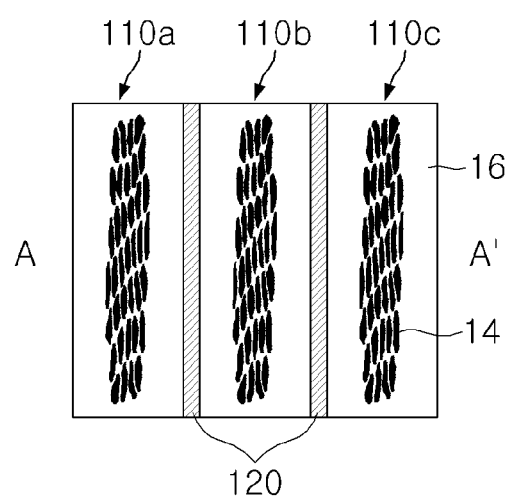
FIG. 3 is a diagram illustrating a cross-section of the coil of FIG. 1 according to another exemplary embodiment.

FIG. 3 is a diagram illustrating a structure of a cross-section of the superconducting coil according to another exemplary embodiment of the present invention.

Referring to FIG. 3, each of the superconducting wires 110a, 110b, and 110c has a structure of a first-generation wire in which a superconducting portion 14 in the form of a filament is arranged inside a metal matrix, such as a metal stabilizing portion 16. The superconducting portion may be manufactured by a superconducting material, such as Bi2223. Similar to FIG. 2, MIT material layers 120 are interposed between the superconducting wires 110a, 110b, and 110c.

The MIT described with reference to FIGS. 2 and 3 generally refers to a material which has low electrical conductivity at a temperature less than a predetermined temperature (transition temperature) to operate as an insulator, but exhibits sharp increase in electrical conductivity at the transition temperature or higher.

Even in the specification of the present invention, the MIT is used as the substantially same meaning as a general usage thereof. However, the MIT suitable for the present invention has a transition temperature equal to or higher than a critical temperature of a superconducting wire and has an electrical conductivity rate before and after a section including the transition temperature of the MIT of preferably $10^3$ or more, more preferably, $10^5$ or more.

In the present invention, the MIT has a transition temperature equal to or higher than a critical temperature of the superconducting material used in the wire. A transition temperature of the MIT may be preferably less than a critical temperature of the superconducting material+150 K, more preferably, less than the critical temperature+100 K, and further more preferably, less than the critical temperature+50 K. Further, in consideration of the feature that high heat enough to cause burn-out of the coil is generated when the quench is generated, a transition temperature of the MIT usable in the present invention may be around a room temperature. As a matter of course, the transition temperature of the MIT may be equal to or higher than the critical temperature of the superconducting material, but is not essentially limited thereto.

An example of the MIT material suitable for the present invention may include a vanadium oxide. A $V_2O_5$ phase in the vanadium oxide is divided into a typical insulator, but the vanadium oxide of a composition of VO, $VO_2$, and $V_nO_{2n-1}$ (herein, n=2 to 9) has a transition temperature and exhibits an electrical metal-insulator transition characteristic.

Figures 4, 5:
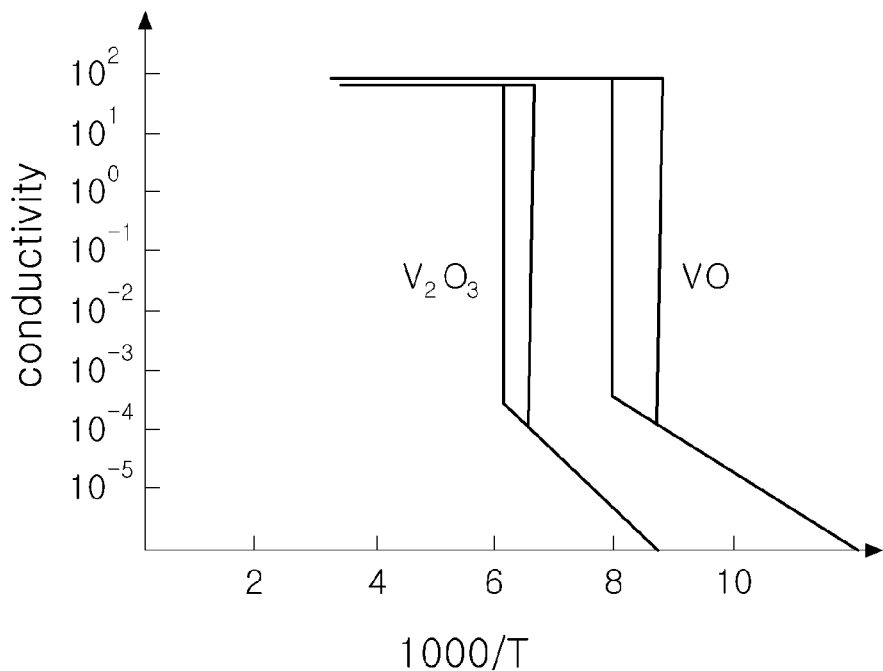
FIG. 4 is a graph schematically illustrating an electrical conductivity characteristic according to temperatures of VO and $V_2O_3$ as an example of a metal-insulator transition (MIT) material of the present invention.
FIG. 5 is a diagram illustrating a transition temperature of a vanadium oxide according to another exemplary embodiment of the present invention.

FIG. 4 is a graph schematically illustrating an electrical conductivity characteristic according to temperatures of VO and $V_2O_3$ as an example of the MIT material of the present invention.

Referring to FIG. 4, changes in electrical conductivity of the MIT during temperature increasing and decreasing processes progress different paths, such as a hysteresis loop. In the case of VO, when a temperature increases, electrical conductivity sharply increases $10^3$ times or more around 123 K (−150° C.) that is the transition temperature, and in the case of $V_2O_3$, electrical conductivity sharply increases $10^3$ times or more around 163 K (−110° C.).

FIG. 5 is a diagram illustrating a transition temperature of a vanadium oxide according to another exemplary embodiment of the present invention.

A transition temperature value of the vanadium oxide expressed by $V_nO_{2n-1}$ (n=2 to 9) may be calculated by an appropriate model. FIG. 4 represents a value of a transition temperature $T_t$ presented in "Metal-Insulator Transition Temperatures and Excitonic Phases in Vanadium Oxides", by A. L. Pergament, International Scholarly Research Network ISRN Condensed Matter Physics Volume 2011, Article ID 605913, 5 pages, as an example of the transition temperature.

In the meantime, in the present invention, as the MIT material, various materials exemplified below may be used.

TABLE 1

| Material | Transition temperature | Resistance ratio |
|---|---|---|
| $Fe_3O_4$ | 120 K | 100 to 1000 |
| $RNiO_3$ (R = La, Sm, Nd, Pr) | 130 to 240 K | 100 to 1000 |
| $La_{1-x}Sr_xNiO_4$ | 40 to 240 K | 100 to 10000 |
| $NiS_{1-x}Se_x$ | 80 to 260 K | 10 to 100 |
| $BaVS_3$ | 74 K | 10000 to 100000 |

Hereinafter, an exemplary embodiment of a superconducting wire suitable to manufacture the superconducting coil of FIG. 1 will be described.

FIGS. 7A to 7D are diagrams schematically illustrating structures of cross-sections of superconducting wires according to exemplary embodiments of the present invention.

Figure 7A:
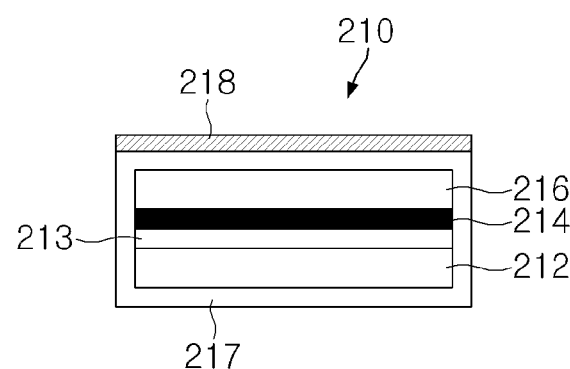
FIGS. 7A to 7D are graphs schematically illustrating structures of a cross-section of a superconducting wire according to an exemplary embodiment of the present invention.

Referring to FIG. 7A, a superconducting wire 210 includes a metal substrate 212 formed with a buffer layer 213, a superconducting layer 214, a capping layer 216, and a stabilizing layer 217. An MIT material layer 218 coats an upper surface of the superconducting wire 210.

The MIT material layer 218 may coat the upper surface of the superconducting wire 210 by an appropriate coating method. For example, the MIT material layer 218 may be formed by sputtering. Unlike this, a wet method of forming the required MIT material layer 218 from a precursor solution may be used as a matter of course.

Further, unlike this, the MIT material layer may also be formed by a method of welding or joining a separately manufactured strip-type MIT material layer. Further, an MIT strip having flexibility may be bonded onto one surface or both surfaces of the wire. To this end, a polymer material may also be used as a binder of the MIT material, and further, in this case, the polymer binder may also include a conductive polymer.

Further, in the present invention, a thickness of the MIT material layer 218 may be appropriately selected in consideration of an electrical and mechanical characteristic of the coating layer.

As described above, the MIT material layer 218 may be formed of a general MIT material, for example, a vanadium oxide, such as VO and $V_nO_{2-1}$ (n=2 to 9), a mixed composition thereof, or a complex of the phases thereof. Depending on a case, an additional compound may be included in the MIT material layer 218.

Figure 7B:
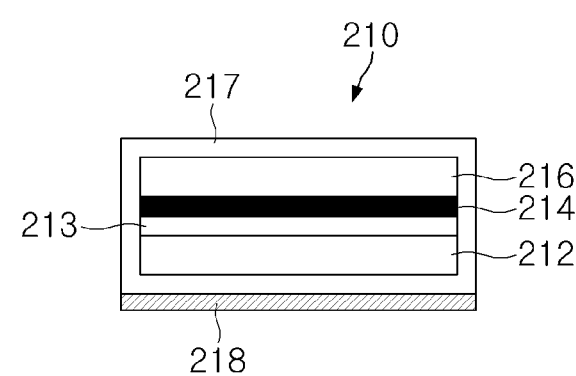
Figure 7C:
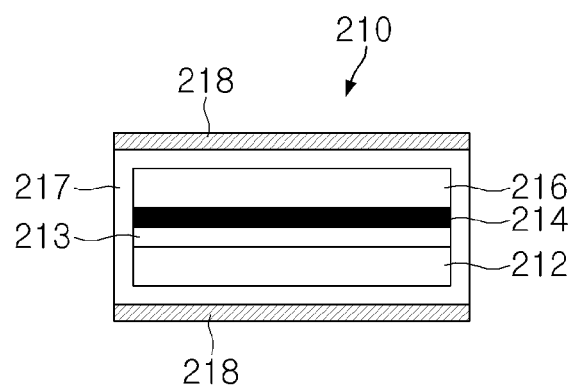
Figure 7D:
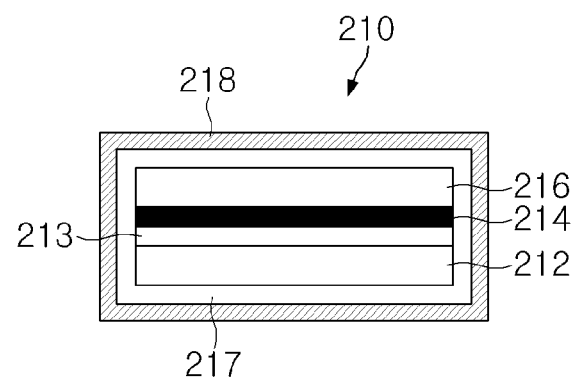
Figure 8A:
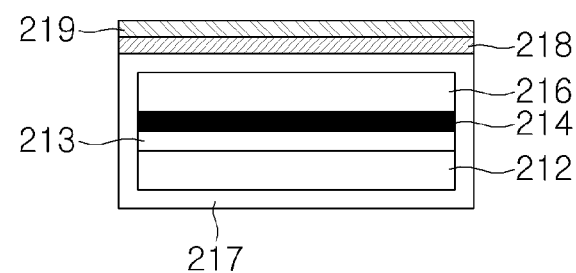
FIGS. 8A to 8D are diagrams schematically illustrating structures of a cross-section of a superconducting wire according to another exemplary embodiment of the present invention.
Figure 8B:
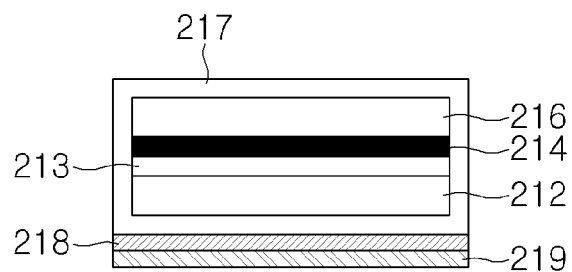
Figure 8C:
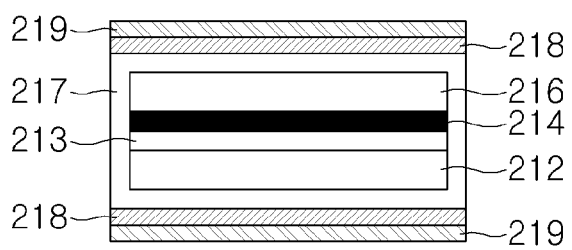
Figure 8D:
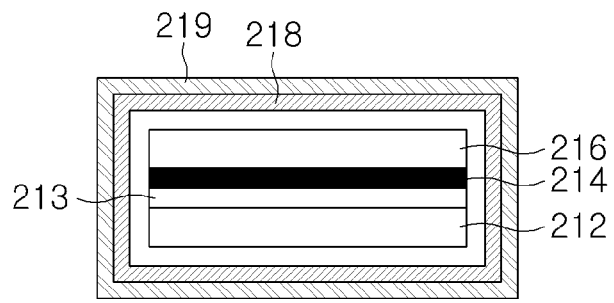

The MIT material layer 218 may also be formed on a lower surface of the superconducting wire 110 as illustrated in FIG. 7B, and the MIT material layer 218 may also be formed on both an upper surface and a lower surface of the superconducting wire 110 as illustrated in FIG. 7C. Further, as illustrated in FIG. 7D, the MIT material layer 218 may be formed so as to surround an upper surface, a lower surface, and a lateral surface of the superconducting wire.

FIGS. 8A to 8D are diagrams schematically illustrating structures of cross-sections of superconducting wires according to other exemplary embodiments of the present invention.

Compared to FIGS. 7A to 7D, the superconducting wire of FIGS. 8A to 8D are different from that of FIGS. 7A to 7D in that a conductive protecting layer 219 is formed on an MIT material layer 218. The conductive protecting layer 219 protects the MIT material layer 218. The conductive protecting layer 219 has good conductivity in order to provide a conductive path when the MIT material layer 218 is in a metal state. For example, a conductive metal, such as Cu, Ag, and Al, or an alloy thereof may be used as a material forming the protecting layer.

Figure 6:
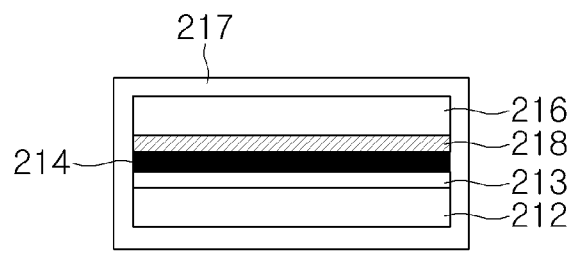
FIG. 6 is a diagram schematically illustrating a structure of a cross-section of a superconducting wire according to still another exemplary embodiment of the present invention.

FIG. 6 is a diagram schematically illustrating a structure of a cross-section of a superconducting wire according to still another exemplary embodiment of the present invention.

Referring to FIG. 6, similar to FIG. 7A, the superconducting wire includes a metal substrate 212 formed with a buffer layer 213, a superconducting layer 214, a capping layer 216, and a stabilizing layer 217. However, the superconducting wire of FIG. 6 is different from the superconducting wire of FIG. 7A in that an MIT material layer 218 is formed inside the wire of FIG. 6, and particularly, the MIT material layer 218 is in direct contact with an upper surface of the superconducting layer.

The superconducting wire of the present invention described above may be manufactured by various schemes. In addition to the method of manufacturing the superconducting wire in the related art, various schemes of forming the MIT material layer 218 may be used. A dry coating method, such as sputtering and chemical vapor deposition, may be used, and various applying processes, such as a general wet coating process including flow coating, dip coating, spin coating, and spray coating, may be used.

Figure 9A:
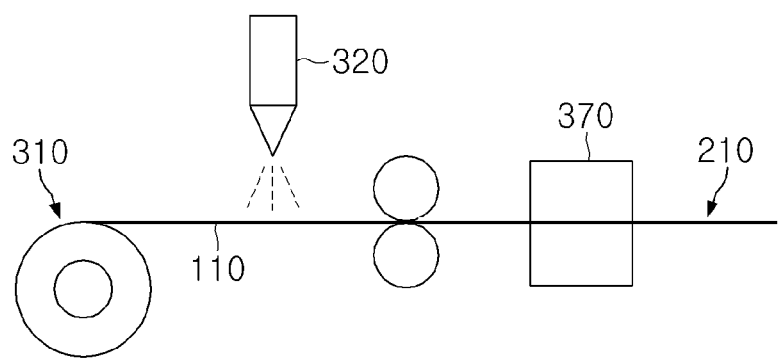
FIGS. 9A and 9B are diagrams illustrating an example of an MIT material layer applying device according to an exemplary embodiment of the present invention.

FIG. 9A is a diagram illustrating an example of an MIT material layer applying device according to an exemplary embodiment of the present invention.

Superconducting wires 110 and 210 wound around a roll 310 are unwound at a predetermined speed and are supplied to an applying device 320. The applying device 320 provides an MIT solution onto the superconducting wire 110. The applying device 320 may include, for example, a sprayer or a dispenser. The applying device 320 consecutively or intermittently receives the MIT solution from an MIT solution supplying device (not illustrated). As a matter of course, in addition to or instead of the sprayer or the dispenser, a predetermined film applicator may be used as the applying device.

As illustrated, the superconducting wire on which the MIT material is applied is pressurized by a pressurizing means, such as a roller, so that an MIT material layer having a uniform thickness may be formed. A heating means, such as a heater, may be embedded in the roller. Further, additionally, the superconducting wire 210 formed with the MIT material layer may pass through a dryer 370 and be dried.

Figure 9B:
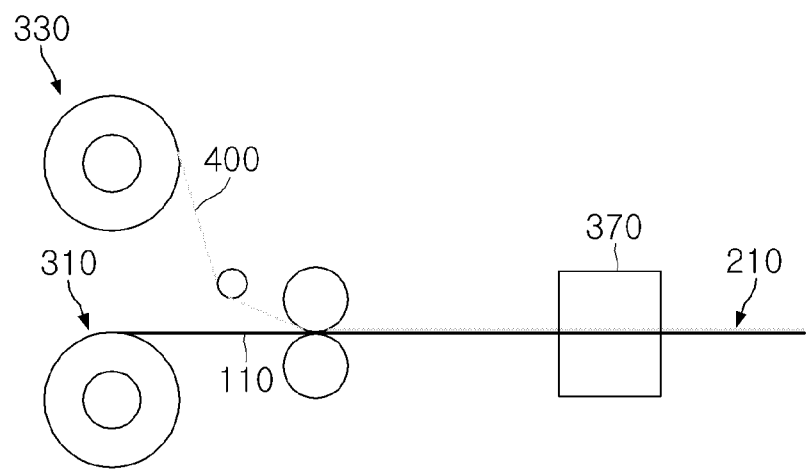

FIG. 9B is a diagram illustrating an example of an MIT material layer applying device according to another exemplary embodiment of the present invention.

Referring to FIG. 9B, an MIT supplying roll 330 is provided in the applying device together with a superconducting wire winding roll 310. The MIT supplying roll 310 supplies an MIT material layer in the form of a tape. The MIT material layer may include an MIT material and appropriate additives for molding the MIT material layer in the form of the tape. An MIT tape 400 from the MIT supplying roll 330 is bonded with the superconducting wire 110 supplied from the superconducting wire winding roll 310 by a pressurizing means, such as a pressurizing roller. The bonded superconducting wire 210 may be further subjected to an additional process, such as drying by a drier 370.

In the foregoing, the case where the MIT material layer is formed on one surface of the superconducting wire 110 has been described with reference to FIG. 9, but the applying device 320 may form the MIT material layer on both surfaces or throughout the entire outer portion of the superconducting wire 110, and to this end, an applying device including two or more injection nozzles may be used. Further, the MIT material layer may also be formed on both surfaces of the superconducting wire by using two or more winding rolls 330 illustrated in FIG. 7B.

FIG. 10 is a diagram illustrating an example of an MIT tape according to an exemplary embodiment of the present invention.

Figure 10A:
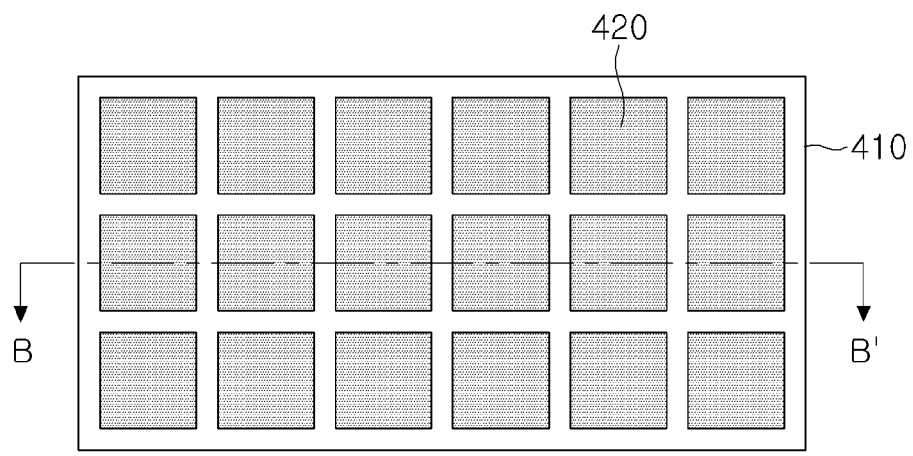
FIGS. 10A and 10B are diagrams illustrating an example of an MIT tape according to an exemplary embodiment of the present invention.
Figure 10B:
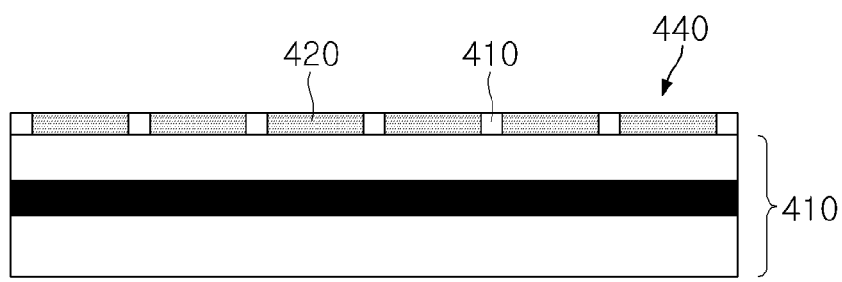

FIG. 10A is a top plan view of an MIT tape, and FIG. 10B is a diagram illustrating a cross-section after the MIT tape is bonded onto a superconducting wire 410. FIG. 10B illustrates the cross-section in a direction B-B' in FIG. 10A.

Referring to FIG. 10A, the MIT tape 400 includes a supporter 410 having a mesh structure and an MIT material layer 420. The MIT material layer 420 is mainly formed in opening portions of the mesh. A size of the opening portion of the mesh structure and a thickness of the supporter may be appropriately selected in consideration of stability and an electric characteristic of the structure.

The MIT tape 400 of the present exemplary embodiment may be manufactured by various methods. For example, the MIT tape 400 may be manufactured by making the supporter 410 of the mesh structure be impregnated with an MIT solution or applying the MIT solution onto the supporter 410 of the mesh structure and then appropriately drying the supporter 410. The MIT tape 400 manufactured by the foregoing scheme may be supplied to the device illustrated in FIG. 6B. Further, in contrast, a tape supporter including no MIT may be supplied to the device illustrated in FIG. 6B, and after the tape supporter is bonded with the superconducting wire, the tape supporter and the superconducting wire may be impregnated or applied with an MIT solution by a separate applying means.

The example of the MIT tape based on the supporter structure has been described with reference to FIG. 10, but the present invention is not limited thereto. The MIT tape may be based on a skeleton different from the foregoing skeleton. For example, an MIT tape formed of MIT powder and a binder supporting the MIT powder may also be used. In this case, a conductive binder may also be used as the binder.

In the foregoing, the exemplary embodiments of the present invention have been described based on the second generation wire including the substrate, the buffer layer, the superconducting layer, the capping layer, and the stabilizing layer, but the present invention is not limited thereto. For example, the technical sprit of the present invention is applicable to a superconducting coil formed of the first generation superconducting wire in which a plurality of superconducting filaments is buried in a conductive metal layer, which those skilled in the art may appreciate.

Figure 11:
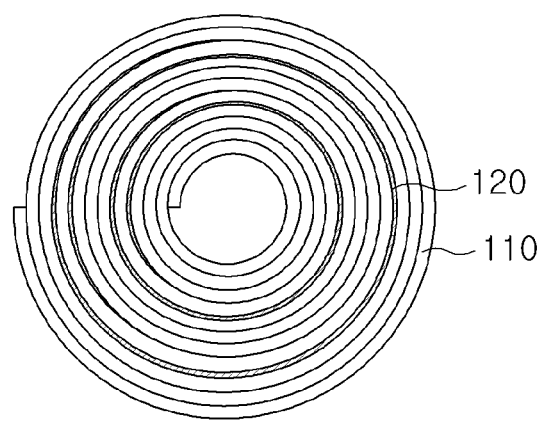
FIG. 11 is a diagram illustrating a structure of a superconducting coil according to another exemplary embodiment of the present invention.

FIG. 11 is a diagram illustrating a structure of a superconducting coil according to another exemplary embodiment of the present invention.

A superconducting wire 110 of the present exemplary embodiment is the same as the superconducting wire that is described with reference to FIG. 1 in that the superconducting wire 110 in the form of a tape extended in a longitudinal direction is wound to form a stacking structure having a cross-section in the form of a concentric circle. However, an MIT material layer 120 interposed between the superconducting wires 110 is not consecutively extended in the longitudinal direction of the superconducting wire.

The MIT material layer 120 is partially interposed between the adjacent turns of the superconducting wire. The foregoing structure has a similar structure to that of a partially insulated coil. For example, the turn in which the MIT material layer is interposed may be arbitrarily selected. Further, the MIT material layer 120 may be interposed so that the MIT material layer 120 of one turn is repeated for the n times of turn of the superconducting wire. The superconducting coil of the present exemplary embodiment is more suitable for the case where stability of a coil is required compared to a response characteristic of a coil.

Figure 12:
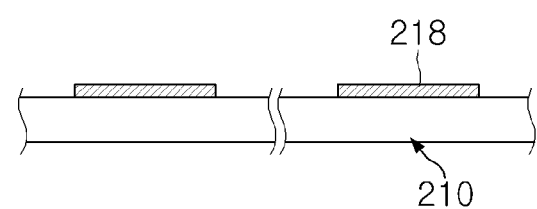
FIG. 12 is a diagram schematically illustrating a superconducting wire suitable to construct the coil structure of FIG. 9.

FIG. 12 is a diagram schematically illustrating a superconducting wire suitable to construct the coil structure of FIG. 11.

FIG. 12 is a diagram illustrating a lateral surface of the superconducting wire. Referring to FIG. 12, an upper surface of the superconducting wire is coated with a non-consecutive MIT material layer 218. An interval between the adjacent MIT material layers 218 may be determined according to a length of the turn and a required coil characteristic.

In the above, the present invention has been described based on the superconducting coil and the superconducting wire applicable to the superconducting coil. However, for example, the present invention is also applicable to a superconducting cable in the case where the plurality of wires is stacked or wound, which those skilled in the art may appreciate.

Hereinafter, an example of the present invention will be described.

A. Manufacture MIT Solution and Superconducting Coil $V_2O_3$ powder was mixed with polyvinylidene fluoride (PVDF) and N-methyl-2-pyrrolidone (NMP), which serve as a binder, with an appropriate ratio. Viscosity of the mixture may be controlled by adjusting the content of binder. In the present example, a coating slurry was prepared by mixing 97 wt % of $V_2O_3$ and 3 wt % of PVDF+NMP.

B. Measure Transition Temperature of Metal-Insulator

Separate wires, each of which was manufactured by coating both surfaces of the BI-BSCCO high-temperature superconducting wire of the Sumitomo Corp. with the prepared coating solution, were disposed while overlapping, and a conductive lead was connected to both ends of each wire. Next, voltages applied to both ends of the conductive leads were measured. The wire disposition was put into liquid nitrogen, was maintained for a predetermined time, and then was taken out to the outside to measure a temperature and a voltage of the wire.

Figure 13:
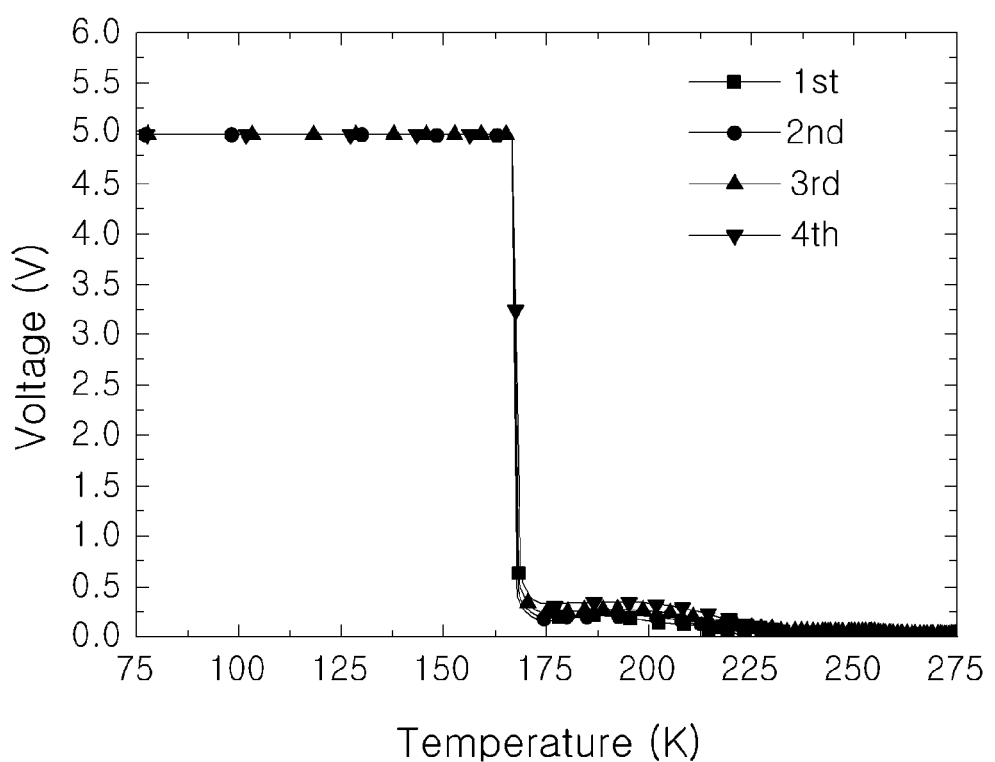
FIG. 13 is a graph illustrating a change in a voltage according to a change in a temperature of an MIT bulk.

FIG. 13 is a graph illustrating a change in a voltage according to a change in a temperature of an MIT bulk.

Referring to FIG. 13, it can be seen that a $V_2O_3$ bulk has a predetermined resistance value from a temperature of the liquid nitrogen to a transition temperature (about 160 K) from the change in a voltage value of the $V_2O_3$ bulk, and the resistance value is sharply decreased at a temperature around the transition temperature.

C. Manufacture Superconducting Coil

Similar to the foregoing, the superconducting wire was wound around a bobbin having a diameter of 140 mm while coating both surfaces of the BI-BSCCO high-temperature superconducting wire of the Sumitomo Corp., with the $V_2O_3$ slurry. The number of turns of the stacked superconducting wires was eight. The wound coil was heat treated at a temperature of 110° C. for 18 hours and a solvent was removed. Subsequently, an external surface of the coil was coated with epoxy and was cured in the air for three days to manufacture a superconducting coil.

For comparison with the present invention, a superconducting coil having the same form was manufactured with a superconducting wire in which an MIT material layer was not coated. The superconducting wire was insulated by a Kapton tape, was wound, was coated with epoxy, and was cured.

A voltage, a current, a temperature, and a magnetic flux density of the manufactured superconducting coil were measured. As measurement equipment, the data acquisition (DAQ) and the LabVIEW program of the National Instrument Company were used. In this case, a voltage tap was installed in each turn of the coil to measure a voltage for each turn and voltages for the entire turns. Further, a current was measured by installing a shunt resistor in an output terminal of a power supply. A magnetic field was measured by positioning a hall sensor which is capable of measuring a magnetic field at an extremely low temperature at a center of the coil. A temperature of the coil was measured by inserting the E-type thermocouple to a space between the fourth turn and the fifth turn.

Figure 14:
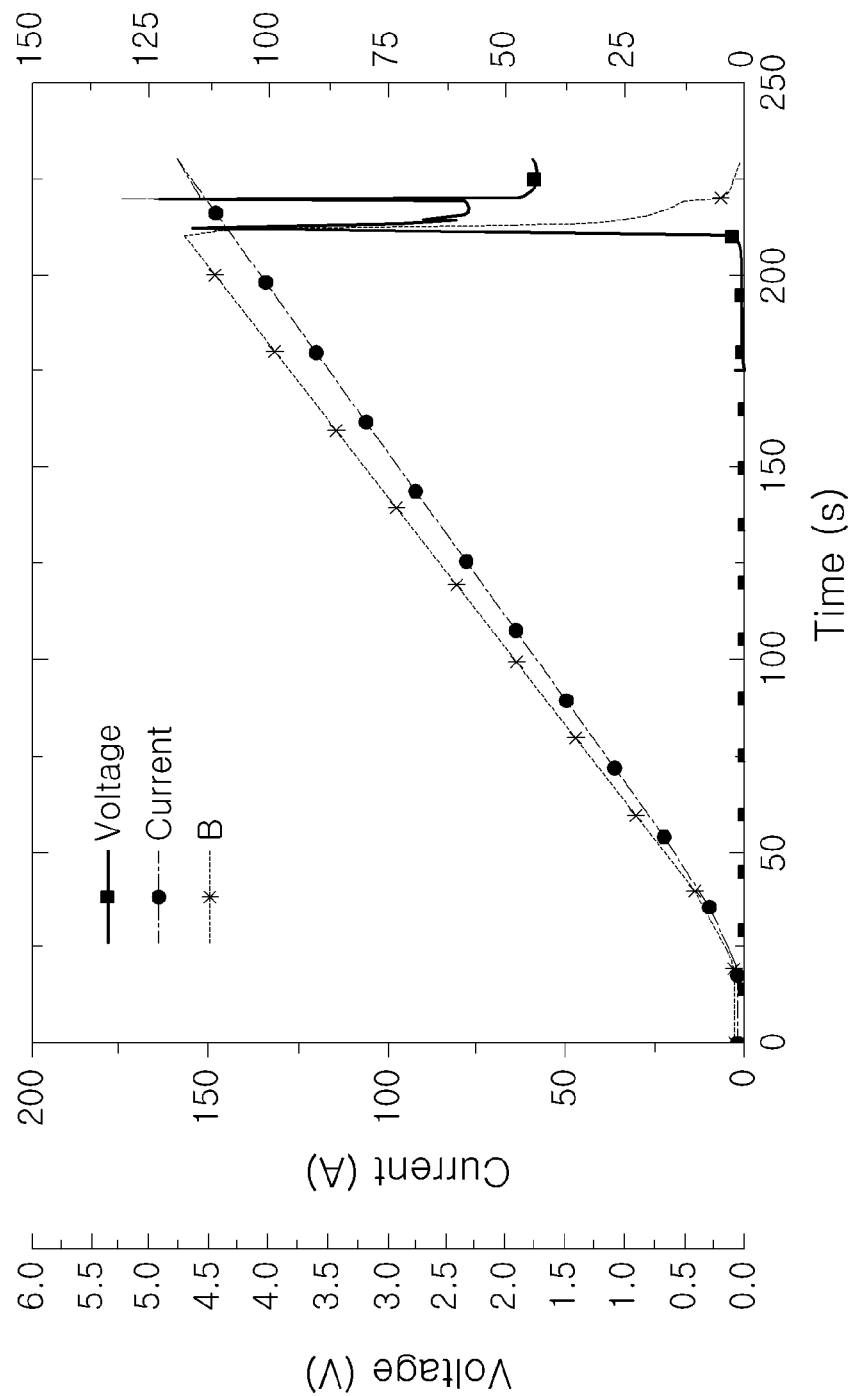
FIG. 14 is a graph illustrating a result of a measurement of a voltage, a current, and a magnetic flux density of the superconducting coil to which MIT coating is applied according to the present exemplary embodiment.

FIG. 14 is a graph illustrating a result of a measurement of a voltage, a current, and a magnetic flux density of the superconducting coil to which MIT coating is applied.

As illustrated in FIG. 14, it is observed that the voltage sharply increases after about 210 secs after application of a voltage, and the voltage increases and decreases for a predetermined time in a subsequent section.

Figure 15:
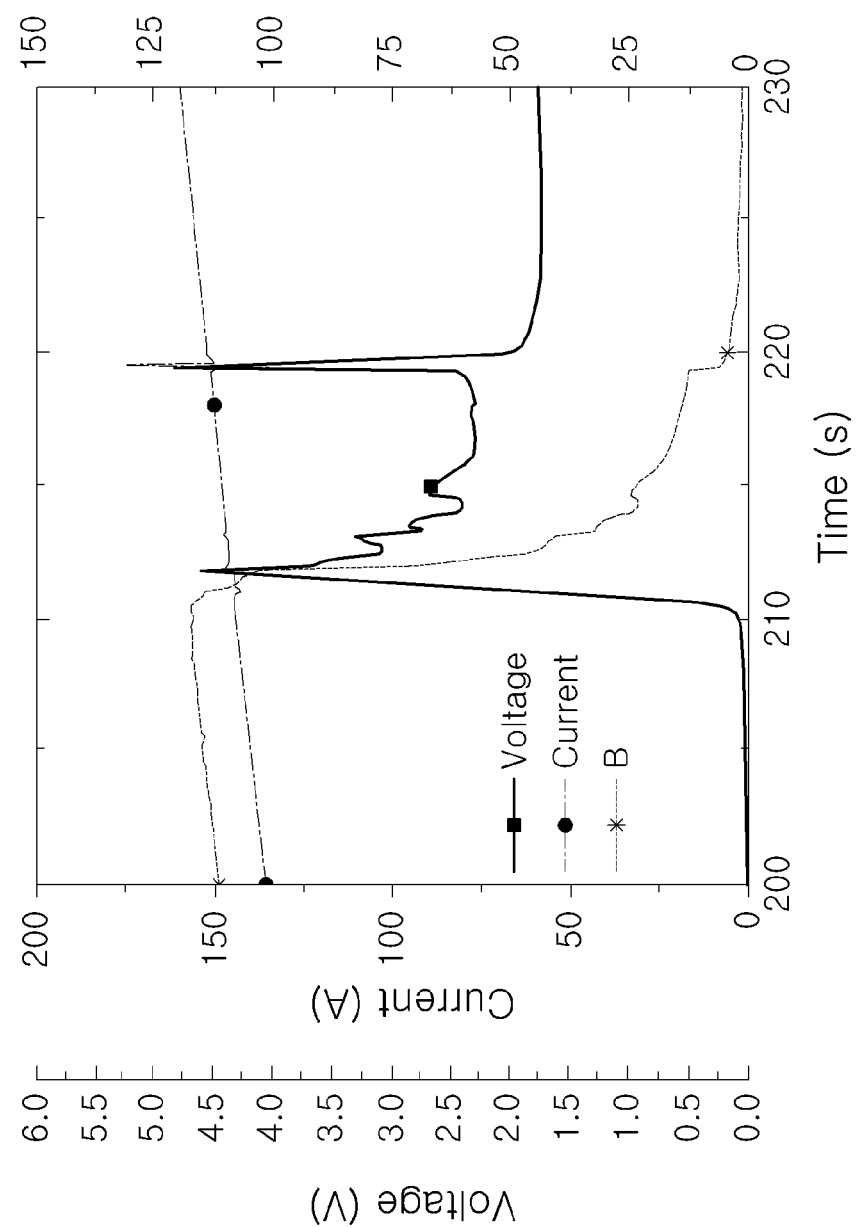
FIG. 15 is an enlarged diagram illustrating a partial section of FIG. 14.

FIG. 15 is an enlarged diagram illustrating a time section of FIG. 12.

Referring to FIG. 15, it can be seen that it is observed that the voltage increases and decreases for about 20 secs after about 210 secs elapses. Further, it can be seen that a magnetic flux density gently decreases in this section.

The graph may be interpreted as described below. Quench is generated at a predetermined position of the superconducting wire when 210 secs elapses after a voltage is applied, and heat according to the generation of the quench heats the MIT material layer formed in a corresponding region and phase-changes the MIT material layer to a conduction state. According to the phase transition, the current temporarily bypasses to the MIT material layer and the heat in the quench region is suppressed. As a matter of course, after about 20 secs, the superconducting wire comes to be destructed due to the continuous heating.

That is, it is demonstrated that the MIT material layer of the present exemplary embodiment suppresses resistance of the superconducting wire from sharply increasing and delays the destruction of the wire. Further, the delay of the increase in the voltage shown in the present exemplary embodiment enables the detection of the quench by measuring a change in a voltage and a magnetic flux density. Further, the delay of the increase in the voltage may give sufficient time to actively controlling the coil, such as an operation stop of the coil.

Figure 16:
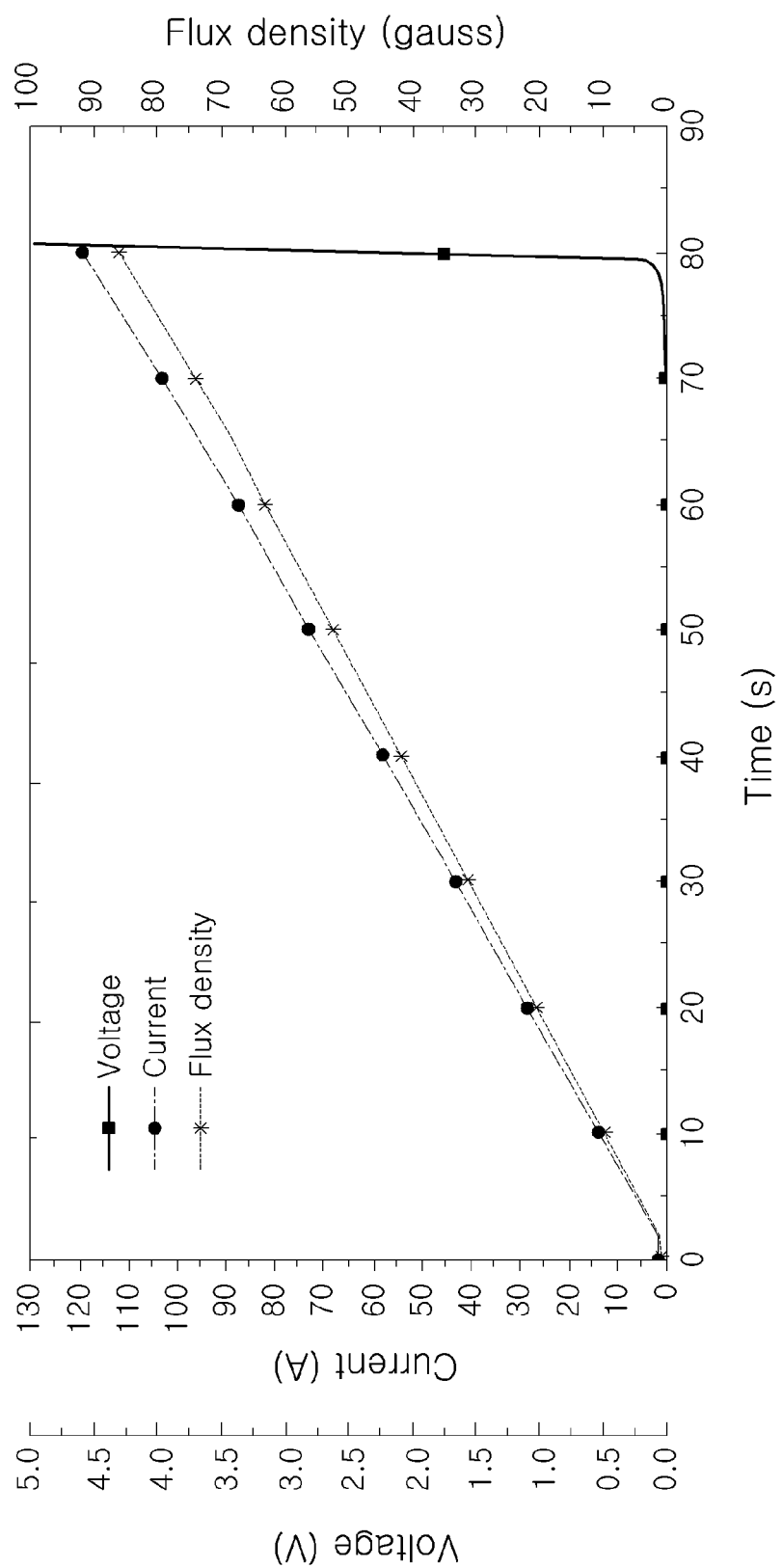
FIG. 16 is a graph illustrating a result of a measurement of a voltage, a current, and a magnetic flux density of a superconducting coil insulated by a Kapton tape for comparison with the present invention.

FIG. 16 is a graph illustrating a result of a measurement of a voltage, a current, and a magnetic flux density of a superconducting coil insulated by a Kapton tape for comparison with the present invention.

As illustrated in FIG. 16, it can be seen that the coil is destructed in an instant due to the increase in the voltage generated after about 80 secs. In this case, it is impossible to detect the generation of the quench or control an operation of the coil.

The exemplary embodiments of the present invention have been described with reference to the accompanying drawings, but those skilled in the art will understand that the present invention may be implemented in another specific form without changing the technical spirit or an essential feature thereof. Thus, it is to be appreciated that the embodiments described above are intended to be illustrative in every sense, and not restrictive.

INDUSTRIAL APPLICABILITY

The present invention is applicable to a superconducting wire, a superconducting coil, a superconducting cable, and the like.

The invention claimed is:

1. A high-temperature superconducting coil, which is wound from a high-temperature superconducting wire including a metal substrate, a buffer layer on the metal substrate, and a superconducting layer extended in a longitudinal direction with a predetermined width, the high-temperature superconducting coil comprising:
    a metal-insulator transition (MIT) material layer interposed between adjacent high-temperature superconducting wires,
    wherein the MIT material layer insulates adjacent superconducting wires in a superconducting state of the superconducting coil, and provides a bypass path for a current across adjacent superconducting wires in a normal conduction state of the superconducting coil.

2. The high-temperature superconducting coil of claim 1, wherein the MIT material layer has a transition temperature equal to or higher than a critical temperature of the high-temperature superconducting wire.

3. The high-temperature superconducting coil of claim 2, wherein electrical conductivity of the MIT material layer increases $10^3$ times or more at a temperature at or around the transition temperature.

4. The high-temperature superconducting coil of claim 2, wherein electrical conductivity of the MIT material layer increases $10^5$ times or more at a temperature at or around the transition temperature.

5. The high-temperature superconducting coil of claim 2, wherein the MIT material layer has the transition temperature equal to or lower than a room temperature.

6. The high-temperature superconducting coil of claim 1, wherein the MIT material layer comprises at least one material selected from the group consisting of $VO_2$ and $V_nO_{2n-1}$ wherein, n=2–6 or 8.

7. The high-temperature superconducting coil of claim 6, wherein the MIT material layer comprises at least one material selected from the group consisting of $Fe_3O_4$, $RNiO_3$ (R=La, Sm, Nd, or Pr), $La_{1-x}Sr_xNiO_4$ (herein, x<1), $NiS_{1-x}Se_x$ (herein, x<1), and $BaVS_3$.

8. The high-temperature superconducting coil of claim 1, wherein a transition temperature of the MIT material layer is lower than a critical temperature of +100 K.

9. The high-temperature superconducting coil of claim 1, wherein the high-temperature superconducting wire comprises a superconducting portion and conductive external metal skin surrounding the superconducting material, and
    the MIT material layer is interposed between the external metal skin of adjacently stacked high-temperature superconducting wires.

10. A high-temperature superconducting wire, comprising:
    stacked layers extending in a longitudinal direction, which comprise a metal substrate, a buffer layer on the metal substrate, a superconducting layer stacked on the buffer layer, and a stabilization layer surrounding the superconducting layer; and
    a metal-insulator transition (MIT) material layer with which at least a part of an upper surface or a lower surface of the stacked layers is coated and which extends in an extension direction of the superconducting layer,
    wherein the MIT material layer includes a supporter, and a metal-insulator transition material supported on the supporter, and the supporter has a mesh structure.

11. The high-temperature superconducting wire of claim 10, further comprising:
    a conductive protecting layer on the MIT material layer.

12. The high-temperature superconducting wire of claim 11, wherein the conductive protecting layer is electrically insulated from the stabilization layer surrounding the superconducting layer at a temperature equal to or lower than a critical temperature of the superconducting layer.

13. The high-temperature superconducting wire of claim 10, wherein the MIT material layer comprises at least one material selected from the group consisting of $VO_2$ and $V_nO_{2n-1}$ wherein, n=2–6 or 8.

14. The high-temperature superconducting wire of claim 10, wherein the MIT material layer comprises:
    a MIT material powder; and
    a binder binding the MIT material powder.

* * * * *